United States Patent
Gorsha

(10) Patent No.: US 10,382,143 B1
(45) Date of Patent: Aug. 13, 2019

(54) METHOD FOR INCREASING TONE MARKER SIGNAL DETECTION RELIABILITY, AND SYSTEM THEREFOR

(71) Applicant: AC Global Risk, Inc., San Francisco, CA (US)

(72) Inventor: Leonid Gorsha, San Francisco, CA (US)

(73) Assignee: AC Global Risk, Inc., San Francisco, CA (US)

( * ) Notice: Subject to any disclaimer, the term of this patent is extended or adjusted under 35 U.S.C. 154(b) by 0 days.

(21) Appl. No.: 16/106,907

(22) Filed: Aug. 21, 2018

(51) Int. Cl.
| | | |
|---|---|---|
| *H04B 3/00* | (2006.01) | |
| *H04B 11/00* | (2006.01) | |
| *G10L 21/04* | (2013.01) | |
| *G10L 21/0332* | (2013.01) | |
| *G10L 19/018* | (2013.01) | |
| *G10L 25/48* | (2013.01) | |

(52) U.S. Cl.
CPC ............ *H04B 11/00* (2013.01); *G10L 19/018* (2013.01); *G10L 21/0332* (2013.01); *G10L 21/04* (2013.01); *G10L 25/48* (2013.01)

(58) Field of Classification Search
CPC ... H04B 11/00; G10L 19/018; G10L 21/0332; G10L 21/04
See application file for complete search history.

(56) References Cited

U.S. PATENT DOCUMENTS

| | | | | |
|---|---|---|---|---|
| 5,999,900 A | * | 12/1999 | Hollier | G10L 25/69 370/249 |
| 6,453,283 B1 | * | 9/2002 | Gigi | G10L 25/90 704/201 |
| 6,885,986 B1 | * | 4/2005 | Gigi | G10L 25/90 704/207 |
| 2006/0053017 A1 | * | 3/2006 | Gigi | G10L 13/07 704/267 |
| 2006/0059000 A1 | * | 3/2006 | Gigi | G10L 13/07 704/258 |
| 2009/0003481 A1 | * | 1/2009 | Schopfer | H04B 3/542 375/260 |
| 2013/0066395 A1 | * | 3/2013 | Simon | A61N 2/006 607/48 |
| 2015/0070148 A1 | * | 3/2015 | Cruz-Hernandez | G08B 6/00 340/407.1 |
| 2018/0061385 A1 | * | 3/2018 | Stone | G10H 1/08 |

\* cited by examiner

*Primary Examiner* — Simon King
(74) *Attorney, Agent, or Firm* — Goodwin Procter LLP

(57) ABSTRACT

A method of and system for increasing the reliability of signal detection, that includes receiving at least one audio recording comprising at least one sound marking signal and performing waveform analysis on the sound marking signal to determine whether the sound marking signal is fragmented into a plurality of signal portions. If the sound marking signal is fragmented into a plurality of signal portions, the method further includes confirming that portions of the fragmented sound marking signal possess characteristics of a sinusoidal signal.

18 Claims, 3 Drawing Sheets

METHOD FOR INCREASING TONE MARKER SIGNAL DETECTION RELIABILITY, AND SYSTEM THEREFOR

TECHNICAL FIELD

In various embodiments, the present invention relates to methods and systems for increasing tone marker detection reliability, and, more specifically, to methods and systems that perform waveform analysis to confirm that portions of a fragmented sound signal include characteristics of a sinusoidal signal sufficient to conclude that the fragmented sound signal may be a tone marker signal.

BACKGROUND OF THE INVENTION

Conventionally, sound (or tone) markers may be used in the transmission of sound signal data to identify those portions of a sound recording within a sound signal of greater or more significant importance. Disadvantageously, when sound signal data are transmitted through one or more communication channels, the sound marker signal may become distorted making recognition more difficult. For example, jitter, which connotes a deviation from periodicity of a signal that, but for the jitter, is known to be periodic, may result in the fragmentation of the sound markers. Such fragmentation may, otherwise, affect the sound marker to such a degree that the fragmented sound marker may not be recognized as a sound marker. When this is the case, the sound signal data lagging the sound marker may be unknowingly ignored, losing sound signal data of greater or more significant importance altogether.

SUMMARY OF THE INVENTION

As a result, it would be desirable to provide a method and system for more reliably identifying a portion of a transmitted sound recording that has been fragmented, e.g., by jitter spikes, as a sound marker.

In a first aspect, the present invention relates to a method of increasing the reliability of signal detection. In some embodiments, the method includes the steps of receiving one or more audio recordings including one or more sound marking signals, e.g., a signal having at least one of a predetermined duration and a predetermined amplitude, and performing waveform analysis on the sound marking signal(s) to determine whether the sound marking signal(s) has been fragmented into a plurality of signal portions. If the sound marking signal(s) has been fragmented into a plurality of signal portions, the method further includes confirming that portions of the fragmented sound marking signal possess characteristics of a sinusoidal signal having a period. In some applications, the sound marking signal(s) may include a signal comprising a duration of at least six periods.

For example, in some implementations, confirming that portions of the fragmented sound marking signal(s) possess characteristics of a sinusoidal signal may include: scanning, using a scanning window, the audio recording comprising the sound marking signal; identifying at least one signal maximum, at least one signal minimum, and at least one point of zero magnitude (i.e., zero crossing magnitude) between a discrete signal maximum and a discrete signal minimum; and, if the signal maximum occurs prior to the signal minimum: confirming that signal magnitudes increase from the signal minimum to the signal maximum, confirming that a mathematical difference between adjacent magnitudes on the waveform between the signal minimum and the zero crossing magnitude are positive and increasing, and confirming that a mathematical difference between adjacent magnitudes on the waveform between the zero crossing magnitude and the signal maximum are positive and decreasing. Otherwise, if the signal minimum occurs prior to the signal maximum: confirming that signal magnitudes decrease from the signal maximum to the signal minimum, confirming that a mathematical difference between adjacent magnitudes on the waveform between the signal maximum and the zero crossing magnitude are negative and increasing, and confirming that a mathematical difference between adjacent magnitudes on the waveform between the zero crossing magnitude and the signal minimum are negative and decreasing. In some variations, the scanning window may have a width equal to the period the sinusoidal signal, each increasing mathematical difference may increase monotonically, and/or each decreasing mathematical difference may decrease monotonically.

In a second aspect, the present invention relates to a system for increasing the reliability of signal detection. In some embodiments, the system includes a non-transitory machine-readable medium for storing information, a user interface, and one or more signal processing device that is adapted for executing instructions stored in the non-transitory machine-readable medium. In some implementations, the signal processing device may be configured to execute instructions to: receive one or more audio recordings having least one or more sound marking signals (e.g., a signal having a predetermined duration and/or a predetermined amplitude) and perform waveform analysis on the sound marking signal(s) to determine whether the sound marking signal(s) is fragmented into a plurality of signal portions. In some implementations, if the sound marking signal(s) is fragmented into a plurality of signal portions, the signal processing device may be further configured to execute instructions to confirm that portions of the fragmented sound marking signal(s) possess characteristics of a sinusoidal signal having a period. In some variations, the sound marking signal may include a signal having a duration of six or more periods.

In some applications, the signal processing device may be adapted to execute instructions to confirm that portions of the fragmented sound marking signal possess characteristics of a sinusoidal signal. For example, the signal processing device may be adapted to execute instructions that: scan, using a scanning window, the audio recording having the sound marking signal; identify one or more signal maximum, one or more signal minimum, and one or more zero crossing magnitude between a discrete signal maximum and a discrete signal minimum. If the signal maximum occurs prior to the signal minimum: confirm that signal magnitudes increase from the signal minimum to the signal maximum, confirm that a mathematical difference between adjacent magnitudes on the waveform between the signal minimum and the zero crossing magnitude are positive and increasing, and confirm that a mathematical difference between adjacent magnitudes on the waveform between the zero crossing magnitude and the signal maximum are positive and decreasing. Otherwise, if the signal minimum occurs prior to the signal maximum: confirm that signal magnitudes decrease from the signal maximum to the signal minimum, confirm that a mathematical difference between adjacent magnitudes on the waveform between the signal maximum and the zero crossing magnitude are negative and increasing, and confirm that a mathematical difference between adjacent magnitudes on the waveform between the zero crossing magnitude and the signal minimum are negative and decreasing.

In some variations, the scanning window may have a width equal to the period the sinusoidal signal. In some applications, each increasing mathematical difference may increase monotonically and/or each decreasing mathematical difference may decrease monotonically.

In a third aspect, the present invention relates to a non-transitory machine-readable medium for storing information. In some embodiments, the medium may include computer-executable instructions that are adapted to receive one or more audio recording having one or more sound marking signal (e.g., a signal having at least one of a predetermined duration and a predetermined amplitude) and perform waveform analysis on the sound marking signal(s) to determine whether the sound marking signal(s) is fragmented into a plurality of signal portions. If the sound marking signal(s) is fragmented into a plurality of signal portions, the medium may further include computer-executable instructions that are adapted to confirm that portions of the fragmented sound marking signal(s) possess characteristics of a sinusoidal signal having a period. In some variations, the sound marking signal(s) may include a signal having a duration of six or more periods.

In some applications, to confirm that portions of the fragmented sound marking signal(s) possess characteristics of a sinusoidal signal, the computer-executable instructions are further adapted to: scan, using a scanning window, the audio recording(s) having the sound marking signal(s), identify one or more signal maximum, one or more signal minimum, and one or more zero crossing magnitude between a discrete signal maximum and a discrete signal minimum. If the signal maximum occurs prior to the signal minimum, the computer-executable instructions are further adapted to: confirm that signal magnitudes increase from the signal minimum to the signal maximum, confirm that a mathematical difference between adjacent magnitudes on the waveform between the signal minimum and the zero crossing magnitude are positive and increasing, and confirm that a mathematical difference between adjacent magnitudes on the waveform between the zero crossing magnitude and the signal maximum are positive and decreasing. Otherwise, if the signal minimum occurs prior to the signal maximum, the computer-executable instructions are further adapted to: confirm that signal magnitudes decrease from the signal maximum to the signal minimum, confirm that a mathematical difference between adjacent magnitudes on the waveform between the signal maximum and the zero crossing magnitude are negative and increasing, and confirm that a mathematical difference between adjacent magnitudes on the waveform between the zero crossing magnitude and the signal minimum are negative and decreasing.

In some variations, the scanning window comprises a width equal to the period the sinusoidal signal. In some implementations, each increasing mathematical difference may increase monotonically and/or each decreasing mathematical difference may decrease monotonically.

DESCRIPTION OF THE DRAWINGS

In the drawings, like reference characters generally refer to the same parts throughout the different views. For the purposes of clarity, not every component may be labeled in every drawing. Also, the drawings are not necessarily to scale, emphasis instead generally being placed upon illustrating the principles of the invention. In the following description, various embodiments of the present invention are described with reference to the following drawings, in which.

DETAILED DESCRIPTION

Remote Risk Assessment System

Figure 1:
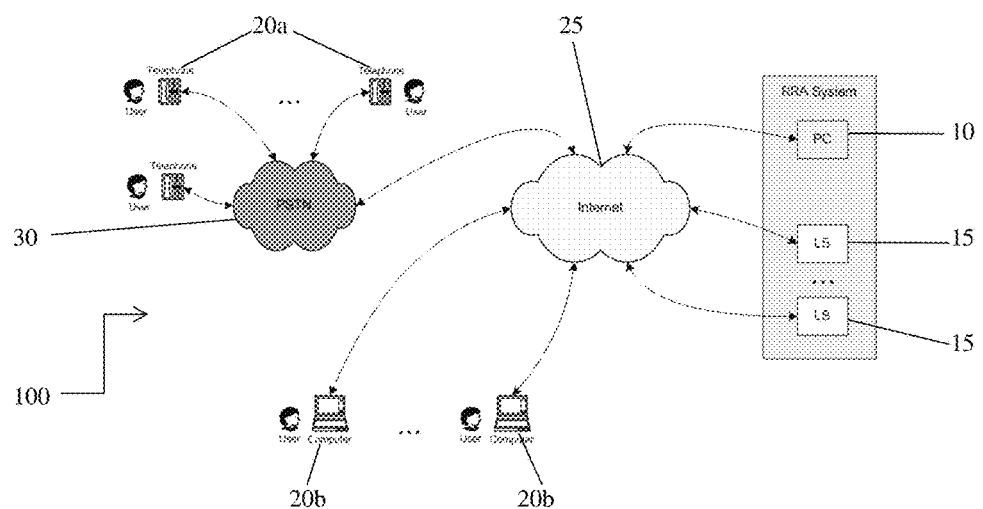
FIG. 1 shows a schematic of a Remote Risk Assessment system (RRA) and communication network in accordance with some embodiments of the present invention.

Referring to FIG. 1, a Remote Risk Assessment ("RRA") system in accordance with some embodiments of the present invention is shown. In some applications, the RRA system 100 may include a homogeneous, distributed computing and communication network that may include, for example, a processing center ("PC") 10 and one or more full-function local server ("LS") nodes 15. When more than one LS node 15 is included in the system 100, the nodes 15 may be organized in a hierarchical network. The elements of the system 100 may be hardwired in a network or may include mobile (communication) components that can operate autonomously, communicating and transferring data intermittently, e.g., wirelessly.

Although FIG. 1 shows a single PC 10, the number and type of LS nodes 15 may vary depending on the number and physical (geographic) location of risk assessment or other interviews being simultaneously conducted, as well as other administrative requirements. The PC 10 and each LS node 15 may have its own IP address and may be structured and arranged to manage its own data, as well as to handle data from related systems and other LS nodes 15.

In some variations, one or more interview terminals 20a, 20b may be in communication with one or more LS nodes 15, directly, via a communication network (e.g., the Internet 25), and/or via a public switched telephone network (PSTN) 30. Interview terminals may include (landline) telephones 20a, modular phones, cellphones, IPhones, softphones, computers 20b, as well as other mobile voice communication and processing devices. Although FIG. 1 shows that the PSTN 30 communicates with the LS nodes 15 through the Internet 25, in some implementations, the PSTN 30 may communicate directly with the LS nodes 15, outside of the Internet 25.

Given that the quality of communication across the globe is distributed unevenly, substantially all implementations of the RRA system 100 may be characterized by an average distance between an interview terminal 20a, 20b to an LS node 15. Based on distance, all or some portion of the RRA system 100 may be classified as: a mobile system (distances up to about 100 m, which corresponds to the maximum effective range of a CAT 7 Ethernet), a local corporate system (distances up to about 10 km), a local government system (distance up to about 1000 km), and a global system (distance up to about 20,000 km). Local and global systems are, typically, stationary networks that work, predominantly, in an on-line mode. During emergency conditions, local and global systems may operate temporarily on an off-line basis until the cause of the emergency has been rectified. In contrast, mobile systems typically may operate in an off-line mode, requiring on-line access and communication with an LS node 15 sporadically, for example, when data need to be transmitted and/or to receive the results of an interview. Advantageously, even in an extreme case in which there is no electrical power and/or no telecommunication, the RRA system 100 may operate effectively via mobile, self-powered devices.

In order to join an interview with a service interview, communication between an interview terminal 20a, 20b and an LS node 15 should be established, e.g., using or via the node's "Clients" module. For example, a (landline) telephone 20a may establish communication with an LS node 15 via a PSTN 30 using a telephone number either to a call center or directly to the LS node 15 itself. IPhones and/or cellphones may establish communication with an LS node 15 via a WAN or a LAN network. In some variations, previous registration and entry of an access parameter may be required to facilitate establishing the communication. Access parameters may include, for the purpose of illustration and not limitation, one or more of: a password, a port number, the IP address of the node, and/or a conditional service number. SKYPE and other on-line methods of communicating using a computer or processing device 20b may establish communication with an LS node 15 via a connection through one or more WAN and a PSTN 30, e.g., using a telephone number either to a call center or directly to the LS node 15 itself.

The LS nodes 15 may be configured according to modular principles. Between the lowest level and the top of the network, any LS node 15 may be connected to a host node and may itself be a host node at the same time. Thus, the RRA system 100 is hierarchical, such that all LS nodes 15 in a particular level are associated with adjacent LS nodes 15 in the same level; but, that each LS node 15 is only associated with a discrete LS node 15 at a top or upper level.

In some implementations, RRA system topology may display a territorial and/or administrative division of a (geographic) region for collecting interview data. Dimension and topology of the RRA system 100 may also correspond to an actual workload, as well as to geographic requirements.

Although each LS node 15 may operate independently from other LS nodes 15, LS nodes 15 may be in communication with other LS nodes 15 as well as with the PC 10, taking into account the peculiarities of organization procedures for, for example, conducting interviews and so forth.

Each LS node 15 or, collectively, some plurality of the LS nodes 15 may be adapted to perform one or more of: accept incoming calls and provide information about the system 100; support a dialogue with persons/clients in an unattended mode (i.e., without a human operator) in a plurality of foreign languages; reproduce interview questions and record answers; transfer recorded responses to interview questions to other LS nodes 15 (e.g., in an automatic or manual mode) and receive the processing results; generate reports on interview results; and conduct multiple interviews simultaneously and independently.

Security

Security of the RRA system 100 may be ensured, for example, by a choice of systemic remedies (e.g., secure data transfer protocols) and/or by developing applied methods of protection (e.g., encryption of sensitive data).

The primary source of information in the RRA system 100 is a recorded interview that may include, for example, an audio and/or video record of the response(s) of an interviewed person or client to a plurality of questions posed to the person/client during the interview. In order to ensure that the recorded information is not available to others outside of the system 100, the information may be encrypted, which may include both the files containing the person/client's response(s) as well as the results of processing (e.g., of interview results).

Interviews and Service Interviews

An interview may refer to a set of questions that are intended to be asked to a person or client, as well as to an event or the event during which those questions are posed to the person/client (e.g., by an operator or supervisor). In contrast, a service interview may refer to a risk assessment conducted or evaluated, e.g., by a supervisor, based on data collected (e.g., the person/client's responses) during an interview. Typically, the interviewed person/client may be located remotely from the supervisor performing the service interview. Although the interview and the service interview may be conducted simultaneously or substantially simultaneously, in many implementations, data collected during the interview may be recorded and transmitted remotely from the situs of the interview for later review during the service interview.

Advantageously, the RRA system 100 may implement the preliminary interview manually, automatically, or by a combination of the two. For example, in a manual mode, a trained operator or supervisor may ask the person/client a number of questions from a list of interview qualification questions, the answers of which may be used to assess the person/client's status and likelihood of a standard interview. In an automatic mode, the system 100 performs the same functions as the human actor in the manual mode. In a combined mode, the system 100 performs the same functions; however, the supervisor may make an ultimate decision as to the readiness of the person/client for a standard interview. The automatic and combined modes produce an automatic analysis of the person/client's response in the preliminary interview in real time. For example, the person/client's responses may be recognized and the verbal responses evaluated. If any of the responses are flagged as posing a risk, further interviewing may be considered inappropriate.

In some embodiments, the RRA system 100 may implement the standard interview automatically. For example, in automatic mode, the RRA system 100 may ask the person/client questions using TTS (text-to-speech technology) or the voice of an announcer. Responses may be analyzed immediately in real time or responses, often, may be recorded and recorded data provided to the supervisor on-line, e.g., via the communication network, off-line, e.g., via a PSTN 30, or manually at a later date and time.

One of the many advantages of the present system is that special sensors (e.g., biometric devices for detecting bodily reactions of the person/client) are not necessary. Indeed, some implementations, recording and/or transmission of interviews may be accomplished using a public switched telephone network (PSTN) 30 or directly over the Internet 25, e.g., using a computer 20b, IPhone, and the like. In some embodiments, the interview may be conducted using conventional, mobile and non-mobile communication devices, e.g., directly from a local area network (LAN) of the system 100, e.g., using computer terminals 20b, IPhones, and the like, and/or remotely via a global computer network (e.g., a wide area network (WAN)) of a public switched telephone network (PSTN) 30.

Risk Appraisal

Typically, during a preliminary or a standard interview, a first party asks questions. In response to the posed question, a second party may answer the question, may choose not to answer the question (e.g., either by remaining silent or by positively expressing that he/she will not answer the question), or may be evasive in his/her answer to the question. The first party, or interviewer, typically defines the subject matter of the interview and formulates the questions. The interviewer is interested in not only receiving clear answers to the interview questions but also receiving answers that the interviewer has a high level of confidence are accurate. The second party, or interviewee, in many instances may be subject to some external force(s) that requires him/her to answer the questions posed, hence, he/she may try to respond to the questions in a manner most beneficial to his/her personal interests. As a result, there may be some level of uncertainty in accepting the individual responses of the interviewee or any response of the interviewee.

For example, in some embodiments, a series of questions for which only a short (yes or no) answer may be formed. Typically, the response duration for these short questions may range between about 0.1 and 0.5 seconds. As a result, the response may be associated directly with the content of the question asked.

Quality of Interview

Ensuring the desired quality of the interview, and, more especially the person/client's responses to the interview questions, is paramount to the success of the system 100. Indeed, if a calculated level of risk assessment is to be based on audible, visible, and/or verbal responses to interview questions recorded and transmitted by an off-the-shelf communication device, the device used must be able to record and transmit a continuous, uninterrupted event at an acceptable quality level. For example, interviews conducted through the system 100 should include a communication device having the following minimum attributes: a frequency range between 150 Hz and 3500 Hz (50 Hz to 7000 Hz for HD VOIP and wideband); a maximum noise level of −50 dB; and a minimum signal level of at least −35 dB.

Short-Term Jitter

Figure 2:
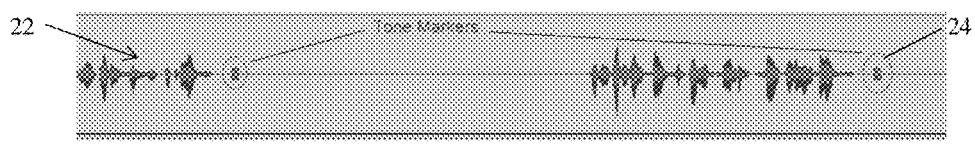
FIG. 2 shows audio recordings having sound markers in accordance with some embodiments of the present invention.

When processing transmitted sound file answers, the RRA system 100 may use a special marking convention for interview records to facilitate identifying the more salient portions of the interview records. Indeed, the relative position of the special marking designates those portions of the transmitted recording that are of final interest and that should be subject to specific system processing. For example, referring to FIG. 2, a transmitted sound file 22, e.g., of an interview record, and a corresponding tone or sound marker 24 are shown. In some implementations, the sound marker 24 leads the sound file 22 and includes a harmonic, i.e., sinusoidal, signal having a specific amplitude and duration, i.e., period (T).

Figure 3A:
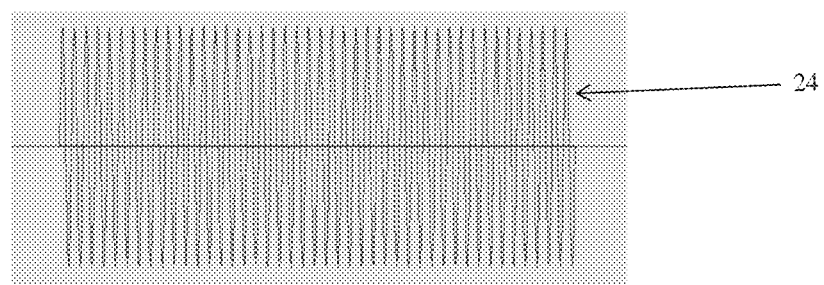
FIG. 3A shows an illustrative embodiment of a sound marker signal.
Figure 3B:
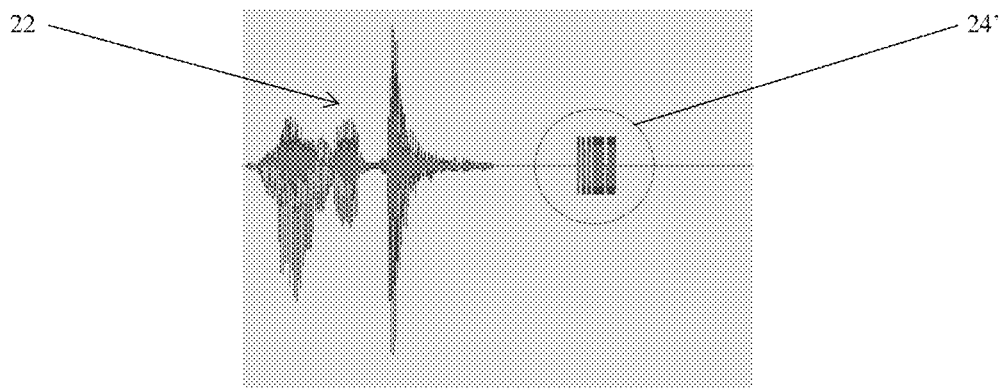
FIG. 3B shows a fragmented sound marker signal leading an audio record in accordance with some embodiments of the present invention.
Figure 3C:
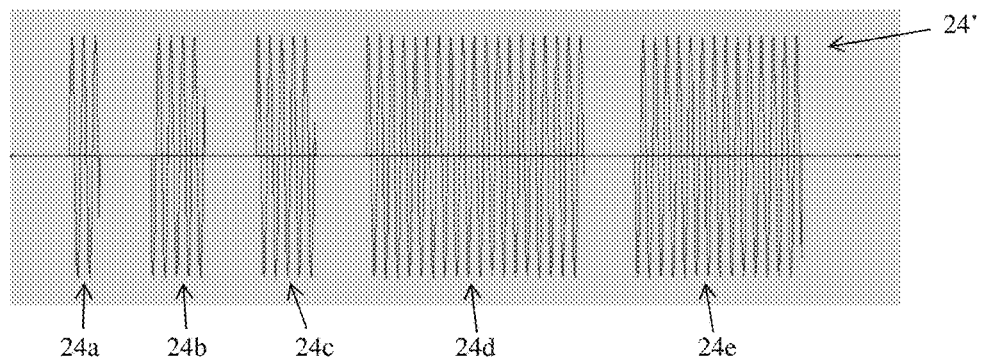
FIG. 3C shows an illustrative embodiment of a fragmented sound marker signal that has been distorted due to jitter spikes.

Under the best of conditions, identifying the sound markers 24 may be greatly simplified; however, when sound signals are transmitted through a communication channel, normal or typical marking signals 24 may become distorted, especially by jitter spikes, such that the structure of the marking signal 24 may be fragmented. For example, FIG. 3A shows an exemplary unfragmented marking signal 24 that has not been affected by jitter, whereas FIGS. 3B and 3C show exemplary marking signals 24' that have been fragmented by jitter. More specifically, the fragmented marking signal 24' in FIGS. 3B and 3C includes five signal fragments 24a to 24e, each having a number of cycles of a signal. Because none of the five signal fragments 24a to 24e, individually, has the necessary duration of the marking file 24, the system may not recognize the fragmented marking signal 24' as a bona fide marking file 24 or ascertain the importance of the corresponding sound file 22 that follows it. Thus, short-term jitter and signal fragmentation may lead to the loss of otherwise valuable information in the accompanying sound file 22. To avoid such loss, a method of increasing the reliability of detection and recognition of tone marker signals 24 is desirable.

In some embodiments of the RRA system 100, a harmonic (sinusoidal) marking signal 24 with a frequency of 440 Hz may be used. Those of ordinary skill in the art can appreciate that marking signals 24 having a different frequency may be used. If we assume that the desired period (T) of the marker signal is 100 ms, then, for a frequency of 440 Hz, the marker signal 24 will include about 800 points.

For the sinusoidal signal mode, and by analogy with the effective value of alternating current, the average weighted value ($M_w$) of the amplitude of the modulus is related to the average peak value ($M_p$) of the amplitude of the modulus according to the relationship:

$$M_w = 0.707 * M_p$$

Thus, recognition and selection of the marker signal 24 among other sound may be performed using characteristic features of the waveform. If the marker signal 24 is distorted, this relationship results in recognition errors and loss of tone markers 24. Moreover, if the tone marker 24 is not identified or apparent, e.g., due to distortion resulting from jitter, the system 100 could not locate the interviewee's response, making the interview incomplete.

Jitter is a special type of signal distortion that is common for digital data transmission signals and involves a delay in the delivery of data packets. In the case of marker signals 24, jitter results in the fragmentation of the marker signals 24' into two or more parts (e.g., five as shown in FIG. 3B). Thus, advantageously, the present invention provides a waveform analysis method and a related system for detecting and verifying the presence of a bona fide marker signal even if the marker signal 24' has been fragmented into smaller waveform section 24a to 24e due to undetectable jitter spikes lasting only milliseconds.

Because marker signals 24 are harmonic (i.e., sinusoidal), within any period (T), the ratios between the signal values in the sequence of digital points remain quite stable. For example, traveling along the waveform from a minimum (a negative) value to a maximum (a positive) value, the modulus value at each point is greater than the modulus value at the previous point and the rate of increase is steadily increasing. Traveling along the waveform from the maximum (a positive) value to another minimum (a negative) value, the modulus value at each point is less than the modulus value at the previous point and the rate of decrease is steadily decreasing. Moreover, since the function sinus is smooth and repeatably differentiable, any change in the mathematical difference in values between neighboring points has the property of monotonicity. Indeed, given the frequency of the harmonic signal (i.e., 440 Hz) one may accurately determine the length of the monotonically changing sequence of points, which is to say that the length is equal to one-half of the number of points in the period.

Figure 4:
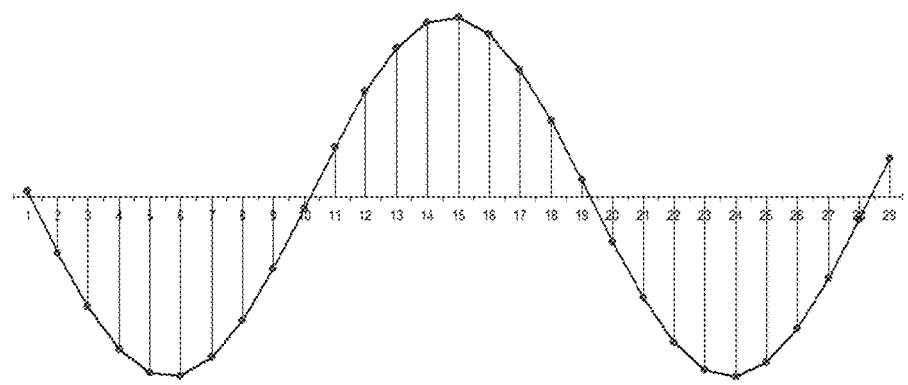
FIG. 4 shows a fragment of a sinusoidal waveform for a sound marker signal in accordance with some embodiments of the present invention.

FIG. 4 shows a portion of an illustrative sinusoidal waveform for a marker signal 24 having with a frequency of 440 Hz. The signal 24 has a minimum at point 6 and a maximum at point 15. The period is 18 points; hence, the next minima and maxima occur at points 24 and 33, respectively. The following are characteristics of the sinusoidal signal:

The modulus values at points 7 to 15 grow monotonically, such that the modulus value at each point is greater than the modulus value at the previous point, e.g., the modulus value at point 11 is greater than the modulus value at point 10 which is greater than the modulus value at point 9, and so forth.

Between points 7 and 10, the mathematic difference between neighboring points is positive and grows monotonically.

Between points 11 and 15, the mathematic difference between neighboring points is positive but decreases monotonically.

The modulus values at points 15 to 24 decrease monotonically, such that the modulus value at each point is less than the modulus value at the previous point, e.g., the modulus value at point 20 is less than the modulus value at point 19 which is less than the modulus value at point 18, and so forth.

Between points 16 and 19, the mathematic difference between neighboring points is negative and decreases monotonically.

Between points 20 and 24, the mathematic difference between neighboring points is negative but grows monotonically.

Accordingly, to confirm that the waveform of a fragmented signal corresponds to fragmented portion 24a to 24e of the marker signal 24 and, consequently, that a usable sound signal 22 follows, one can analyze the local parameters of the fragmented signal 24' to ascertain whether or not each of the six correlations described above are satisfied in a sampling window. For example, in a first step, a short sampling window of the fragmented signal 24' may be scanned for analysis (STEP 1). In some implementations, the width or duration of the short sampling window may equal the period (T) of the harmonic signal. For the sinusoidal curve in FIG. 4, a suitable sampling window and period of the curve equal 18 points.

In a next step, the sampled portion of the harmonic curve is analyzed for presence of the six correlations listed above (STEP 2). If each of the six correlations is satisfied for the initial sampling window, which is to say that all of the conditions characteristic of a harmonic signal are satisfied, then this status may be recorded and further investigation may be conducted on the same harmonic curve for a larger sampling window that may include several consecutive periods (STEP 3). If, after a sampling window of several periods and each of the six correlations is consistently and/or continuously satisfied, one may conclude unambiguously that the sampled fragmented signal 24' corresponds to a bona fide marker signal 24.

In order to ensure that, after the initial sampling window, there are sufficient periods for making an unambiguous conclusion, any waveform fragment subjected to the correlation analysis should include a minimum number of cycles, for example, six (6). The presence of a signal having, for example, at least six (6) cycles, provides assurance and a greater likelihood that the waveform fragment is a bona fide tone marker signal 24 and not part of the general sound signal 22 that may have a sine waveform and a comparable frequency. Indeed, tone markers 24 are sinusoidal signals of sound having a specific frequency and which can, in some instances, look similar to random sound signals contained in the general sound signal 22. By requiring a minimum of, e.g., six (6), periods, bona fide tone marker signals 24 can be distinguished from those portions of general sound signals 22 that, although they may exhibit some of the features of the tone marker signal 24, do not satisfy a minimum period requirement.

Accordingly, referring to FIG. 3B, for a reliable analysis and determination, only fragmented portions 24d and 24e should be evaluated because each has more than six (6) cycles. Fragmented portion 24a only has between two (2) and three (3) cycles, fragmented portion 24b has between four (4) and five (5) cycles, and fragmented portion 24c has five (5) cycles. Those of ordinary skill in the art can appreciate that the selection of six (6) cycles is somewhat empirical. More or fewer cycles may be used without straying from the teaching of this invention.

Nature of the Interview

There are many reasons for conducting an interview of a person/client. For example, the desire to obtain objective risk information about the person/client (e.g., to inquire/investigate about an event such as a theft, fraud, criminal offence, and so forth); to evaluate the mental state of the person/client (e.g., for the performance of a specific function such as military service, air traffic control, and so forth); to assess the accuracy of information provided by a person/client (e.g., for the purposes of employment, granting a security clearance, and so forth); and to assess the person/client's relationship to something (e.g., observance of security rules, execution of one's duties, and so forth). Those of ordinary skill in the art can appreciate that another application of the system may include gathering information for an opinion poll.

For opinion polls, the party commissioning the opinion poll may provide an opinion topic and a list of persons to poll (e.g., a list of phone numbers and corresponding names of the person called). The RRA system 100 can be adapted to perform the telephone calls to each of the names on the list and to conduct the poll in a similar manner as it would conduct an interview. Survey results may then be provided to the party commissioning the poll.

The organization and conduct of a poll using the present system includes the following advantages: the survey may be conducted in an automatic mode, such that each polled person hears the exact same questions spoken by the same announcer, in the same order, and at the same pace; the individual polls can be taken quickly while the poll itself can contact dozens or hundreds of potential respondents simultaneously; polled persons may be asked for and may provide personal, demographic information that may be provided to the poll organizer; and a risk level or level of confidence to the answers of the responding polled person may be evaluated.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative, procedural, or functional languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic disks, magneto optical disks, optical disks, or solid state drives. However, a computer need not have such devices. Moreover, a computer can be embedded in another device, e.g., a smart phone, a mobile audio or video player, a game console, a Global Positioning System (GPS) receiver, or a portable storage device (e.g., a universal serial bus (USB) flash drive), to name just a few. Devices suitable for storing computer program instructions and data include all forms of nonvolatile memory, media and memory devices, including, by way of example, semiconductor memory devices, e.g., EPROM, EEPROM, and flash memory devices; magnetic disks, e.g., internal hard disks or removable disks; magneto optical disks; and CDROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse, a trackball, a touchpad, or a stylus, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method of increasing the reliability of signal detection, the method comprising:
   receiving at least one audio recording comprising at least one sound marking signal; and
   performing waveform analysis on the sound marking signal to determine whether the sound marking signal is fragmented into a plurality of signal portions; and
   if the sound marking signal is fragmented into a plurality of signal portions:
   confirming that portions of the fragmented sound marking signal comprise characteristics of a sinusoidal signal having a period, wherein confirming that portions of the fragmented sound marking signal comprise characteristics of a sinusoidal signal comprises:
      scanning, using a scanning window, the audio recording comprising the sound marking signal;
      ensuring identifying at least one signal maximum, at least one signal minimum, and at least one zero crossing magnitude between a discrete signal maximum and a discrete signal minimum; and
      if the signal maximum occurs prior to the signal minimum:
         confirming that signal magnitudes increase from the signal minimum to the signal maximum;
         confirming that a mathematical difference between adjacent magnitudes on the waveform between the signal minimum and the zero crossing magnitude are positive and increasing; and
         confirming that a mathematical difference between adjacent magnitudes on the waveform between the zero crossing magnitude and the signal maximum are positive and decreasing; and
      if the signal minimum occurs prior to the signal maximum:
         confirming that signal magnitudes decrease from the signal maximum to the signal minimum;
         confirming that a mathematical difference between adjacent magnitudes on the waveform between the signal maximum and the zero crossing magnitude are negative and increasing; and
         confirming that a mathematical difference between adjacent magnitudes on the waveform between the zero crossing magnitude and the signal minimum are negative and decreasing.

2. The method of claim 1, wherein the sound marking signal comprises a signal having at least one of a predetermined duration and a predetermined amplitude.

3. The method of claim 1, wherein the sound marking signal comprises a signal comprising a duration of at least six periods.

4. The method of claim 1, wherein the scanning window comprises a width equal to the period the sinusoidal signal.

5. The method of claim 1, wherein each increasing mathematical difference is increasing monotonically.

6. The method of claim 1, wherein each decreasing mathematical difference is decreasing monotonically.

7. A system for increasing the reliability of signal detection, the system comprising:
   a non-transitory machine-readable medium for storing information;
   a user interface; and
   at least one signal processing device that is adapted for executing instructions stored in the non-transitory machine-readable medium and that is configured to:
   receive at least one audio recording comprising at least one sound marking signal; and
   perform waveform analysis on the sound marking signal to determine whether the sound marking signal is fragmented into a plurality of signal portions; and
   if the sound marking signal is fragmented into a plurality of signal portions:
   confirm that portions of the fragmented sound marking signal comprise characteristics of a sinusoidal signal having a period, wherein to confirm that portions of the fragmented sound marking signal comprise characteristics of a sinusoidal signal, the signal processing device is further configured to:
      scan, using a scanning window, the audio recording comprising the sound marking signal;
      identify at least one signal maximum, at least one signal minimum, and at least one zero crossing magnitude between a discrete signal maximum and a discrete signal minimum; and
      if the signal maximum occurs prior to the signal minimum:
         confirm that signal magnitudes increase from the signal minimum to the signal maximum;

confirm that a mathematical difference between adjacent magnitudes on the waveform between the signal minimum and the zero crossing magnitude are positive and increasing; and confirm that a mathematical difference between adjacent magnitudes on the waveform between the zero crossing magnitude and the signal maximum are positive and decreasing; and if the signal minimum occurs prior to the signal maximum:

confirm that signal magnitudes decrease from the signal maximum to the signal minimum;

confirm that a mathematical difference between adjacent magnitudes on the waveform between the signal maximum and the zero crossing magnitude are negative and increasing; and confirm that a mathematical difference between adjacent magnitudes on the waveform between the zero crossing magnitude and the signal minimum are negative and decreasing.

8. The system of claim 7, wherein the sound marking signal comprises a signal having at least one of a predetermined duration and a predetermined amplitude.

9. The system of claim 7, wherein the sound marking signal comprises a signal comprising a duration of at least six periods.

10. The system of claim 7, wherein the scanning window comprises a width equal to the period the sinusoidal signal.

11. The system of claim 7, wherein each increasing mathematical difference is increasing monotonically.

12. The system of claim 7 wherein each decreasing mathematical difference is decreasing monotonically.

13. A non-transitory machine-readable medium for storing information, the medium comprising computer-executable adapted to:

receive at least one audio recording comprising at least one sound marking signal; and perform waveform analysis on the sound marking signal to determine whether the sound marking signal is fragmented into a plurality of signal portions; and if the sound marking signal is fragmented into a plurality of signal portions:

confirm that portions of the fragmented sound marking signal comprise characteristics of a sinusoidal signal having a period, wherein to confirm that portions of the fragmented sound marking signal comprise characteristics of a sinusoidal signal, the computer-executable instructions are further adapted to:

scan, using a scanning window, the audio recording comprising the sound marking signal;

identify at least one signal maximum, at least one signal minimum, and at least one zero crossing magnitude between a discrete signal maximum and a discrete signal minimum; and if the signal maximum occurs prior to the signal minimum:

confirm that signal magnitudes increase from the signal minimum to the signal maximum;

confirm that a mathematical difference between adjacent magnitudes on the waveform between the signal minimum and the zero crossing magnitude are positive and increasing; and confirm that a mathematical difference between adjacent magnitudes on the waveform between the zero crossing magnitude and the signal maximum are positive and decreasing; and if the signal minimum occurs prior to the signal maximum:

confirm that signal magnitudes decrease from the signal maximum to the signal minimum;

confirm that a mathematical difference between adjacent magnitudes on the waveform between the signal maximum and the zero crossing magnitude are negative and increasing; and confirm that a mathematical difference between adjacent magnitudes on the waveform between the zero crossing magnitude and the signal minimum are negative and decreasing.

14. The medium of claim 13, wherein the sound marking signal comprises a signal having at least one of a predetermined duration and a predetermined amplitude.

15. The medium of claim 13, wherein the sound marking signal comprises a signal comprising a duration of at least six periods.

16. The medium of claim 13, wherein the scanning window comprises a width equal to the period the sinusoidal signal.

17. The medium of claim 13, wherein each increasing mathematical difference is increasing monotonically.

18. The medium of claim 13, wherein each decreasing mathematical difference is decreasing monotonically.

* * * * *